US012752687B2

(12) United States Patent
Im et al.

(10) Patent No.: US 12,752,687 B2
(45) Date of Patent: Oct. 6, 2026

(54) BIDIRECTIONAL SLIDING ARMREST

(71) Applicants: HYUNDAI MOTOR COMPANY, Seoul (KR); KIA CORPORATION, Seoul (KR); ECOPLASTIC CORPORATION, Gyeongju-si (KR)

(72) Inventors: Yoon Im, Suwon-si (KR); Hye Kyung Kim, Suwon-si (KR); Yong Won Choi, Seoul (KR); Hae Ju Park, Ulsan (KR)

(73) Assignees: HYUNDAI MOTOR COMPANY, Seoul (KR); KIA CORPORATION, Seoul (KR); ECOPLASTIC CORPORATION, Gyeongju-si (KR)

( * ) Notice: Subject to any disclaimer, the term of this patent is extended or adjusted under 35 U.S.C. 154(b) by 574 days.

(21) Appl. No.: 18/075,197

(22) Filed: Dec. 5, 2022

(65) Prior Publication Data

US 2023/0226961 A1 Jul. 20, 2023

(30) Foreign Application Priority Data

Jan. 19, 2022 (KR) ........................ 10-2022-0007549

(51) Int. Cl.
*B60N 2/75* (2018.01)

(52) U.S. Cl.
CPC .................................... *B60N 2/773* (2018.02)

(58) Field of Classification Search
CPC ...................................................... B60N 2/773
USPC ......................................................... 296/1.09
See application file for complete search history.

(56) References Cited

U.S. PATENT DOCUMENTS

| | | | | |
|---|---|---|---|---|
| 4,934,750 A * | 6/1990 | Eichler | E05B 83/32 297/188.19 |
| 2003/0184133 A1* | 10/2003 | Mic | B60N 2/793 297/115 |
| 2007/0262632 A1* | 11/2007 | Cody | B60N 2/793 297/411.35 |
| 2009/0256376 A1* | 10/2009 | Schneider | B60N 2/793 296/1.09 |
| 2010/0008606 A1* | 1/2010 | Craddock | B60N 2/773 384/26 |
| 2013/0153447 A1* | 6/2013 | Cinco | B60N 2/793 248/118 |
| 2015/0203006 A1 | 7/2015 | Hipshier et al. | |
| 2017/0175811 A1* | 6/2017 | Zimmermann | A47B 88/497 |
| 2018/0099591 A1* | 4/2018 | Choi | B60N 2/753 |

(Continued)

FOREIGN PATENT DOCUMENTS

| | | |
|---|---|---|
| CN | 206233729 U * | 6/2017 |
| CN | 206456273 U * | 9/2017 |

(Continued)

*Primary Examiner* — Hilary L Gutman
(74) *Attorney, Agent, or Firm* — Lempia Summerfield Katz LLC

(57) ABSTRACT

A bidirectional sliding armrest includes: an armrest cover located at an upper portion of a console body provided in a vehicle body so as to be spaced apart therefrom; a power transmission unit fastened to a lower portion of the armrest cover and configured to move to correspond to operation of the armrest cover; a console fixing unit located on the console body and configured to include a plurality of fixing recesses; and a locking unit located on a lower surface of the armrest cover. The locking unit is fixed to the plurality of fixing recesses, and configured to fix the lengthwise position of the armrest cover.

6 Claims, 6 Drawing Sheets

(56) References Cited

U.S. PATENT DOCUMENTS

| | | | | |
|---|---|---|---|---|
| 2021/0341015 | A1* | 11/2021 | Zimmermann | A47B 88/473 |
| 2024/0416843 | A1* | 12/2024 | Kim | B60N 2/793 |

FOREIGN PATENT DOCUMENTS

| | | | | | |
|---|---|---|---|---|---|
| CN | 208646744 | U | * | 3/2019 | |
| CN | 210733917 | U | * | 6/2020 | |
| CN | 120681040 | A | * | 9/2025 | E05B 83/32 |
| DE | 3529957 | A1 | * | 3/1987 | B60N 2/767 |
| DE | 3807880 | A1 | * | 9/1989 | B60R 7/04 |
| DE | 102005060196 | A1 | * | 12/2006 | B60N 2/773 |
| DE | 202008016824 | U1 | * | 5/2010 | B60N 2/773 |
| DE | 202012008183 | U1 | * | 12/2012 | B60N 2/773 |
| DE | 102011118152 | A1 | * | 5/2013 | B60N 2/773 |
| DE | 102014000026 | A1 | * | 7/2014 | B60N 2/773 |
| DE | 102014220049 | A1 | * | 4/2016 | F16C 29/00 |
| DE | 102019200980 | A1 | * | 7/2020 | B60N 2/773 |
| DE | 102020207763 | A1 | * | 12/2021 | B60N 2/77 |
| DE | 102023208519 | A1 | * | 3/2025 | B60N 2/0264 |
| EP | 1400401 | A2 | * | 3/2004 | B60N 2/773 |
| FR | 3043957 | A1 | * | 5/2017 | B60N 2/773 |
| JP | 2012225075 | A | * | 11/2012 | |
| JP | 2012250682 | A | | 12/2012 | |
| JP | 2015527243 | A | | 9/2015 | |
| KR | 101151103 | B1 | | 6/2012 | |
| KR | 101163450 | B1 | * | 7/2012 | |
| KR | 20120106127 | A | * | 9/2012 | B60N 2/773 |
| KR | 20120134233 | A | | 12/2012 | |
| KR | 20190114259 | A | * | 10/2019 | B60R 7/04 |
| KR | 20220102686 | A | * | 7/2022 | B60N 2/79 |
| KR | 102518664 | B1 | * | 4/2023 | B60N 2/773 |
| KR | 102616518 | B1 | * | 12/2023 | B60N 2/793 |
| KR | 20240032331 | A | * | 3/2024 | B60N 2/773 |
| KR | 20240127282 | A | * | 8/2024 | E05B 83/32 |

* cited by examiner

[ sec A-A' ]

[ sec A-A' ]

BIDIRECTIONAL SLIDING ARMREST

CROSS-REFERENCE TO RELATED APPLICATION

This application claims, under 35 U.S.C. § 119(a), the benefit of priority to Korean Patent Application No. 10-2022-0007549 filed on Jan. 19, 2022, the entire contents of which are incorporated herein by reference.

BACKGROUND

(a) Technical Field

The present disclosure relates to a bidirectional sliding armrest, and more specifically, to a bidirectional sliding armrest that can be fixed in a desired position after sliding in opposite directions by applying a structure in which an armrest cover and a locking unit are connected. The bidirectional sliding armrest can be used in correspondence with various seating positions of a passenger in an autonomous vehicle.

(b) Background Art

In general, a console box for temporarily holding articles is provided between a driver seat and a passenger seat. An armrest, provided to function as a cover and to simultaneously enable a vehicle occupant sitting in either a driver seat or a passenger seat to place an arm thereon, may be installed on the console box.

In particular, the armrest is important in that it is a component provided to enable a driver undertaking long distance driving to shift gears and the like with his/her arm placed thereon, thereby reducing driver fatigue.

This armrest differs from a simple armrest, in which a console is formed and which only covers a part of a shift lever or a parking brake lever installed in a tunnel section of a floor panel between a driver seat and a passenger seat. The armrest may be a large armrest made up of a part of an instrument panel accommodating a switch, a radio, a stereo, a heater control, or a small product receipt pocket, equipped with a box part having a padded cover on the rear surface, and including an ashtray or a switch for rear seats.

According to the advent of autonomous driving, a technology for various passenger seating positions inside the vehicle is being reviewed. Conventional armrests can be adjusted with respect to a forward/backward position only when a driver or a passenger takes a seat toward the front, which causes a problem in which conventional armrests are difficult to be utilized when the position of a first row passenger is changed.

Therefore, in a case of a face-to-face mode in which a first row passenger is rotated at an angle of 180 degrees based on a current position, a technology for providing a function of placing the arm of the passenger or convenience of receipt is needed.

The information disclosed in this Background section is only to enhance understanding of the background of the disclosure. Therefore, the Background section may include information that does not form the prior art already known in this country to a person of ordinary skill in the art.

SUMMARY OF THE DISCLOSURE

The present disclosure has been invented to solve the above conventional problems. Further, an object of the present disclosure is to provide a bidirectional sliding armrest that can be fixed in a desired position after sliding in opposite directions by applying a structure in which an armrest cover and a locking unit are connected.

Further, the present disclosure provides a bidirectional sliding armrest in which a utilizing range of a storage space is wide by applying a locking unit spaced apart from a console body.

These and other objects of the present disclosure are not restricted to the objects mentioned herein, and other objects of the present disclosure not explicitly mentioned herein can be understood by the description below, and can be more clearly understood by the embodiments of the present disclosure. Further, the objects of the present disclosure can be realized by means indicated by the claims or combinations thereof.

In order to achieve the objects of the present disclosure, a bidirectional sliding armrest includes the following configurations.

In an embodiment of the present disclosure, a bidirectional sliding armrest is provided to include: an armrest cover located at an upper portion of a console body provided in a vehicle body so as to be spaced apart therefrom; a power transmission unit fastened to a lower portion of the armrest cover and configured to move to correspond to operation of the armrest cover; a console fixing unit located on the console body and configured to include a plurality of fixing recesses; and a locking unit located on a lower surface of the armrest cover, fixed to the plurality of fixing recesses, and configured to fix the lengthwise position of the armrest cover.

Further, the power transmission unit may include: a knob, one end of which is fastened to opposite ends of the armrest cover; and a link rod connected to the other end of the knob. The link rod may be configured to move in a lengthwise direction by rotation of one end of the knob.

Further, the locking unit may include: a link stopper at which an inclined part is formed and opposite ends of which are inserted into the fixing recess; and a link stopper bracket fixed to the power transmission unit. The link stopper bracket may include inner sides corresponding to the inclined part, and may be formed to enclose sides of the link stopper.

Further, the bidirectional sliding armrest may be configured such that, when the power transmission unit moves in a lengthwise direction, the inclined part is caught on the link stopper bracket to reduce the length of the link stopper, and opposite ends of the link stopper are released from the fixing recess.

Further, the bidirectional sliding armrest may be configured such that the locking unit further includes a slide damper connected to the armrest cover. Additionally, the console fixing unit may include a gear section configured to be engaged with the slide damper in a lengthwise direction, so that the armrest cover is configured to be able to move to opposite sides in a lengthwise direction.

Further, the bidirectional sliding armrest may be configured to further include a spring section, one end of which is fixed to the console fixing unit, and the other end of which is fixed to the locking unit. The spring section may provide elastic restoring force to the armrest cover.

Further, the bidirectional sliding armrest is provided such that the locking unit may further include a link stopper guide formed to enclose the link stopper and configured to constrict widthwise movement of the link stopper.

The present disclosure can obtain the following effects from combinations and use relations with the described disclosure herein and the constitutions described below.

The present disclosure has effects capable of improving convenience of users in an autonomous vehicle because a structure in which the armrest cover and the locking unit are connected is applied (e.g., configured) to slide in the opposite directions, and can be fixed in desired positions.

Further, the locking unit spaced apart from the console body is applied to be able to maximize utility of the storage space.

It should be understood that the term "automotive" or "vehicular" or other similar term as used herein is inclusive of motor-driven automobiles in general. Such motor vehicles may encompass passenger automobiles including sports utility automobiles (operation SUVs), buses, trucks, various commercial automobiles, and watercraft, including a variety of boats and ships, aircraft, and the like. Such motor vehicles may also include hybrid automobiles, electric automobiles, plug-in hybrid electric automobiles, hydrogen-powered automobiles and other alternative fuel-powered automobiles (e.g., powered automobiles with fuels derived from resources other than petroleum). As referred to herein, a hybrid automobile is an automobile that has two or more sources of power, for example both gasoline-powered and electric-powered automobiles.

The above and other features of the disclosure are discussed hereinafter.

BRIEF DESCRIPTION OF THE DRAWINGS

The above and other features of the present disclosure are now described in detail with reference to certain examples thereof illustrated in the accompanying drawings, which are provided hereinbelow by way of illustration only and are not limited to the present disclosure, wherein.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, have been determined in part by the particular intended application and use environment.

In the figures, reference numbers refer to the same or equivalent sections of the present disclosure throughout several figures of the drawings.

DETAILED DESCRIPTION

Hereinafter, embodiments of the present disclosure are described in detail with reference to the accompanying drawings. The embodiments of the present disclosure can be modified in various forms, and it should not be interpreted that the scope of the present disclosure is limited to the following embodiments. The present embodiments are provided to those having ordinary knowledge and skill in the related art to completely describe the present disclosure.

In addition, the term "section," "unit," and the like used herein refers to the unit processing at least one of a function and an operation, which can be realized by hardware, software, or a combination thereof.

Further, "height direction," "width direction," and "length direction" used herein are based on a vehicle.

In addition, when a certain portion is located "on" or "above" another portion, this includes a case in which the certain portion is located "directly above" the other portion, as well where yet another portion is located between the two portions. Moreover, when a certain portion is located "under" or "below" another portion, this includes a case in which the certain portion is located "directly below" the other portion, as well as where yet another portion is located between the two portions.

Furthermore, when a component, device, element, or the like of the present disclosure is described as having a purpose or performing an operation, function, or the like, the component, device, or element should be considered herein as being "configured to" meet that purpose or to perform that operation or function.

Figure 1:
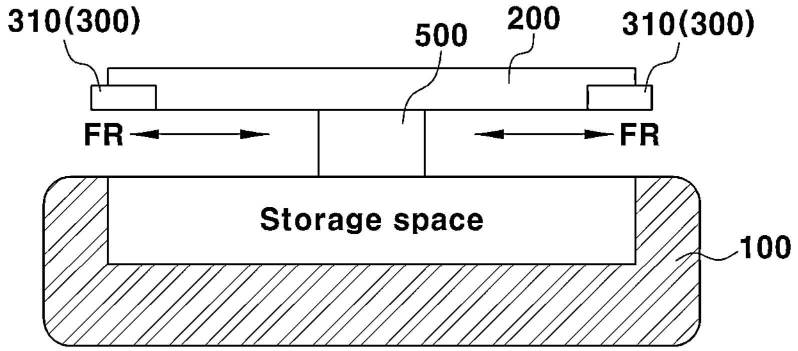
FIG. 1 illustrates a side sectional view of a bidirectional sliding armrest as an embodiment of the present disclosure.

The present disclosure relates to a bidirectional sliding armrest. FIG. 1 illustrates a side sectional view of a bidirectional sliding armrest as an embodiment of the present disclosure.

Referring to FIG. 1, a bidirectional sliding armrest, according to an embodiment of the present disclosure, can be configured to include an armrest cover 200, a power transmission unit 300, and a locking unit 500, which are located above a console body 100.

The armrest cover 200 can be configured to move in a lengthwise direction (i.e., lengthwise direction of a vehicle). In one example, the armrest cover 200 can move to be suitable to place an arm when a passenger takes (i.e., moves) a seat toward the front and the rear of a vehicle. As an embodiment, the armrest cover 200 can be configured such that when a first row passenger takes a seat and rotates 180 degrees with his/her own right arm placed on the armrest cover 200, the passenger fixes the armrest cover 200 in a desired position so as to be able to cradle his/her own left arm.

Fixation or fixation release of the lengthwise position of the armrest cover 200 can be performed by an operation of pulling a knob 310 (of one or more knobs 310) of the power transmission unit 300. When a user pulls a knob 310, the armrest cover 200 fixed by the locking unit 500 is unfixed. A rotational shaft of the knob 310 can be configured to be fixed to the armrest cover 200. Thereby, the armrest cover 200 can be configured to move in a lengthwise direction due to the rotation of the one or more knobs 310.

According to an embodiment of the present disclosure, the locking unit 500 of the bidirectional sliding armrest can be configured such that the console body 100 and the armrest cover 200 are spaced apart from each other. The armrest cover 200 can be configured to be spaced apart above from the console body 100 so as to improve utilization of the storage space.

Figure 2:
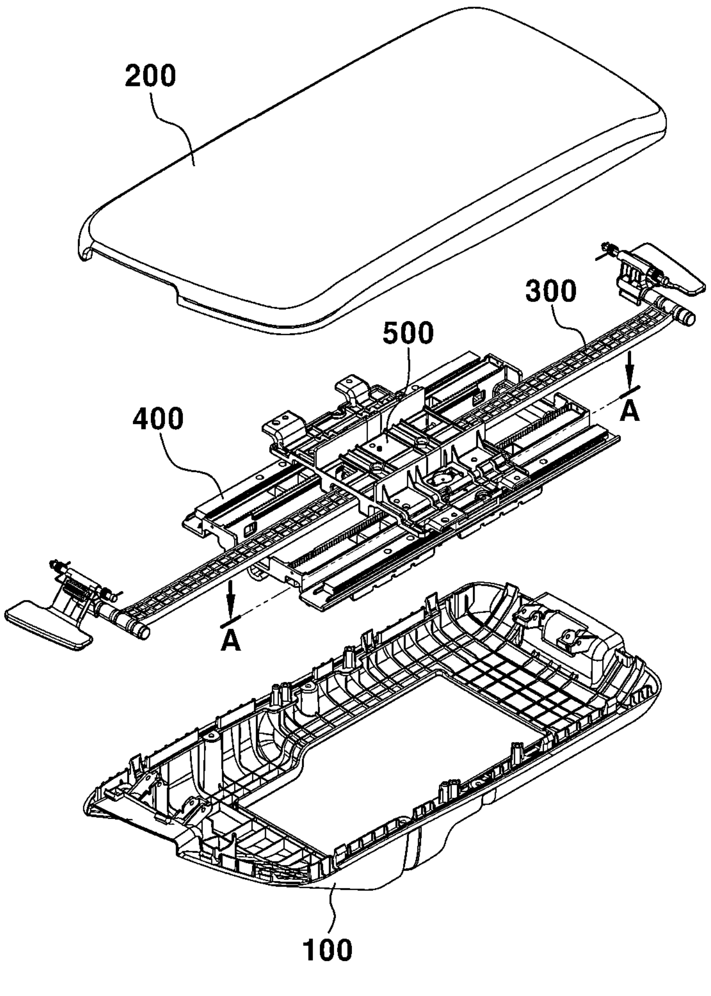
FIG. 2 illustrates a perspective view of the bidirectional sliding armrest as an embodiment of the present disclosure.
Figure 3:
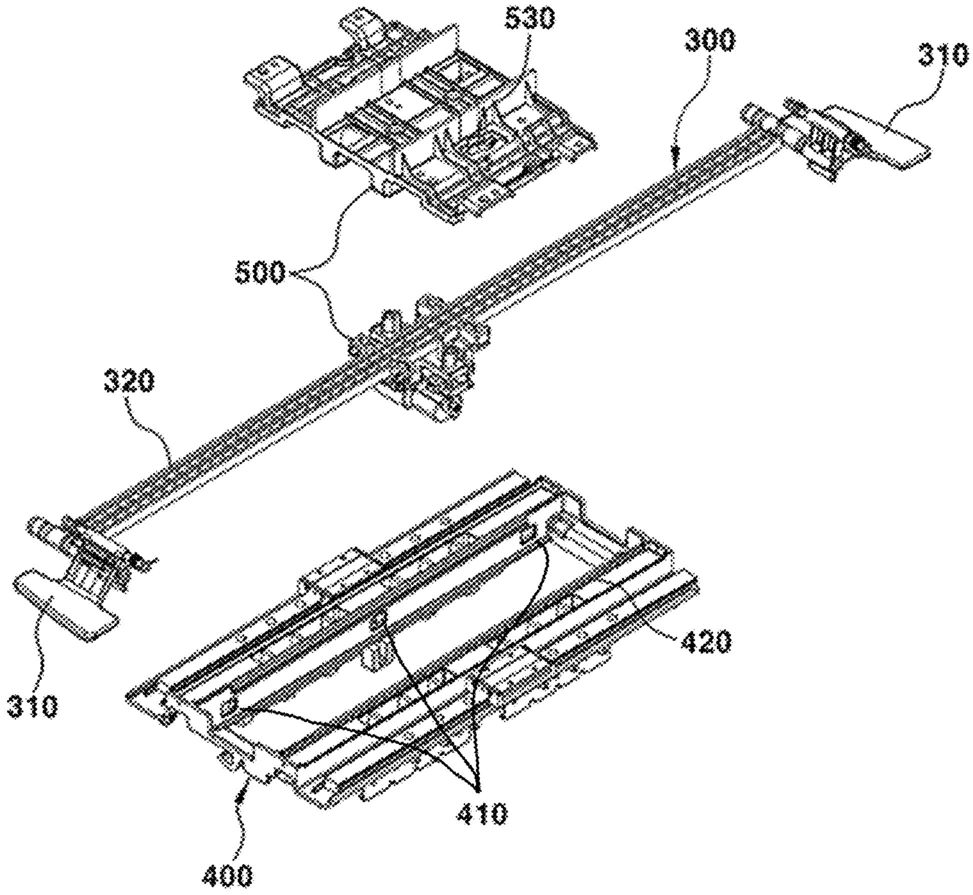
FIG. 3 illustrates a perspective view of a locking unit, a power transmission unit, and a console fixing unit of the bidirectional sliding armrest as an embodiment of the present disclosure.
Figure 4:
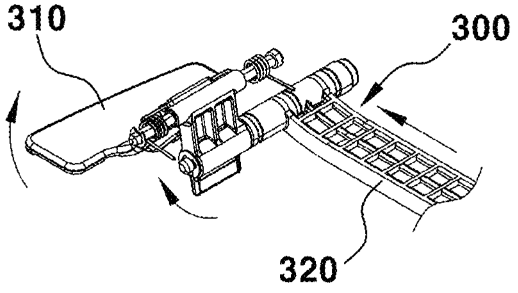
FIG. 4 illustrates the power transmission unit of the bidirectional sliding armrest as an embodiment of the present disclosure.

FIG. 2 illustrates a perspective view of the bidirectional sliding armrest as an embodiment of the present disclosure. FIG. 3 illustrates a perspective view of a locking unit 500, a power transmission unit 300, and a console fixing unit 400 of the bidirectional sliding armrest as an embodiment of the present disclosure. FIG. 4 illustrates the power transmission unit 300 of the bidirectional sliding armrest as an embodiment of the present disclosure.

Referring to FIGS. 2-4, the bidirectional sliding armrest, according to an embodiment of the present disclosure, can be configured to include: an armrest cover 200 that is spaced apart in an upper portion of a console body 100 provided in a vehicle body; a power transmission unit 300 that is fastened to a lower portion of the armrest cover 200 and is configured to move in response to an operation of the armrest cover 200; a console fixing unit 400 that is located in the console body 100 and is configured to include a plurality of fixing recesses 410; and a locking unit 500 that is located on a lower surface of the armrest cover 200. The locking unit 500 is fixed to the plurality of fixing recesses 410 and is configured to fix a lengthwise position of the armrest cover 200.

The armrest cover 200 may be spaced apart at an upper portion of the console body 100 provided in the vehicle body. In one example, the locking unit 500 and the power transmission unit 300 can be configured to be fastened to a lower portion of the armrest cover 200, and configured such that the console fixing unit 400 is located in the console body 100.

The power transmission unit 300 may be configured to be fastened to the lower portion of the armrest cover 200. The power transmission unit 300 may be configured to move in response to an operation of the armrest cover 200. The power transmission unit 300 may be configured to include knobs 310 and a link rod 320. One end of each of the knobs 310 may be configured to be fastened to each of the opposite ends of the armrest cover 200, and the other end of each of the knobs 310 may be configured to be connected to the link rod 320. Each of the knobs 310 may be configured to rotate based on a rotation shaft. When the rotation shaft of each of the knobs 310 is fastened to the armrest cover 200 and the knobs 310 are rotated, the armrest cover 200 may be configured to move in a lengthwise direction.

The link rod 320 may be configured to be connected to the other ends of the knobs 310. In one example, the link rod 320 may be configured to extend in the lengthwise direction of the armrest cover 200, and to be connected to the knobs 310, which are fastened to the opposite ends of the armrest cover 200.

Where one of the ends of the knobs 310 are rotated, the link rod 320 may be configured to move in a lengthwise direction. When a user pulls and rotates the knobs 310, the link rod 320 connected to the knobs 310 may be configured to linearly move toward the knobs 310.

The console fixing unit 400 may be configured to be located in the console body 100 and to include the plurality of fixing recesses 410. The console fixing unit 400 may be configured to include the plurality of fixing recesses 410 so as to fix or unfix the locking unit 500. The locking unit 500 may be configured to be fixed to or unfixed from the fixing recesses 410 so that a lengthwise position of the armrest cover 200 can be adjusted.

Further, the console fixing unit 400 is located in the console body 100, and can guide the armrest cover 200 so as to move in the lengthwise direction. The gear section 420, formed at the console fixing unit 400, and a slide damper 530, formed at the locking unit 500, are configured to be engaged such that the armrest cover 200 moves in the lengthwise direction.

The locking unit 500 may be configured to be located on a lower surface of the armrest cover 200. The locking unit 500 may be configured to be fixed to the plurality of fixing recesses 410 and to fix a lengthwise position of the armrest cover 200. In one example, the locking unit 500 may be configured to be fastened to the armrest cover 200 and to move along the console fixing unit 400 in cooperation with the armrest cover 200.

The locking unit 500 may be configured to include: an upper rail bracket that is fastened to the armrest cover 200; a slide damper 530 that is fastened to the upper rail bracket; a link stopper 510 that has an elastic force; a link stopper bracket 520 that is fastened to the link rod 320; and a link stopper guide 540 that is configured to be fixed to the upper rail bracket.

Figure 5:
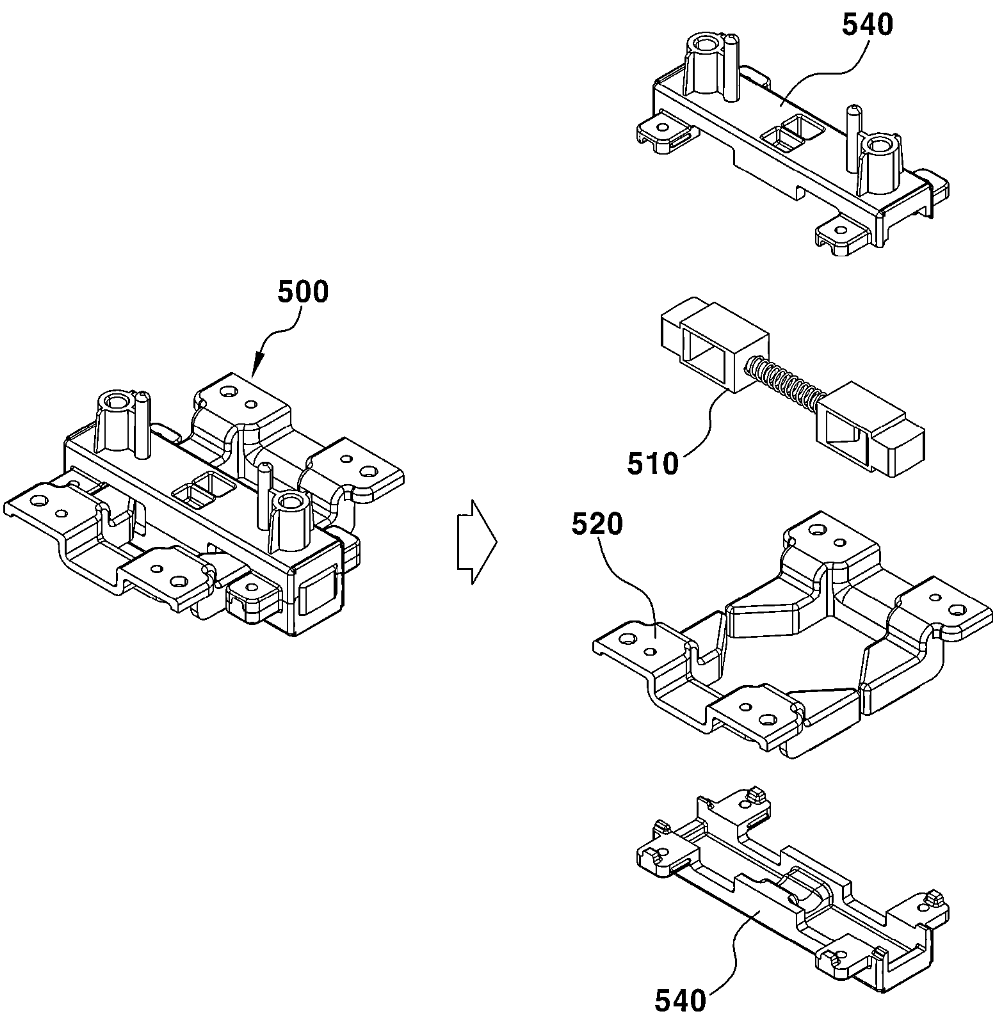
FIG. 5 illustrates a perspective view of the locking unit of the bidirectional sliding armrest as an embodiment of the present disclosure.
Figure 6A:
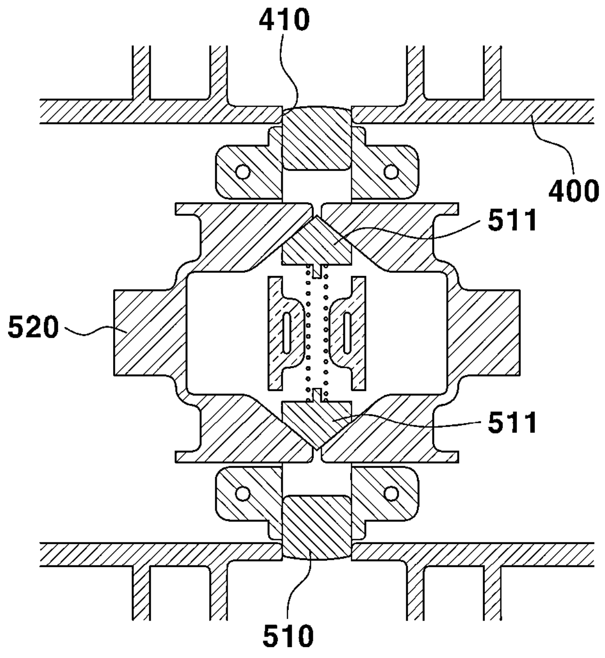
FIG. 6A illustrates a state in which a link stopper of the bidirectional sliding armrest is fixed in a fixing recess, as an embodiment of the present disclosure.
Figure 6B:
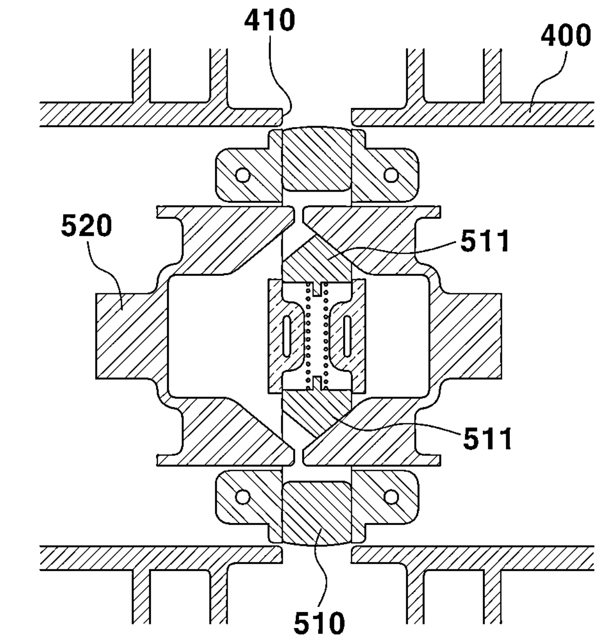
FIG. 6B illustrates a state in which the link stopper is released from the fixing recess of the bidirectional sliding armrest as an embodiment of the present disclosure.

FIG. 5 illustrates a perspective view of the locking unit 500 of the bidirectional sliding armrest, as an embodiment of the present disclosure. FIG. 6A illustrates when a link stopper 510 of the bidirectional sliding armrest is fixed in a fixing recess 410, as an embodiment of the present disclosure. FIG. 6B illustrates when the link stopper 510 of the bidirectional sliding armrest is released from the fixing recess 410, as an embodiment of the present disclosure.

Referring to FIGS. 5-6B, the locking unit 500 may be configured to include a link stopper 510 and a link stopper bracket 520. The link stopper 510 may be configured such that trapezoidal sections 511 are formed, and opposite ends of the link stopper 510 are inserted into the fixing recesses 410. The link stopper 510 may be configured such that the trapezoidal sections 511 are formed at opposite ends thereof (i.e., on opposite ends of an elastic body). The opposite ends of the link stopper 510 may be configured in a shape corresponding to each of the fixing recesses 410. The opposite ends of the link stopper 510 can be configured to be unfixed from the fixing recesses 410 or to be fixed to the fixing recesses 410.

The link stopper bracket 520 may be configured to be fixed to the power transmission unit 300. The link stopper bracket 520 may be formed to enclose the sides of the link stopper 510, including inner sides corresponding to the trapezoidal section 511. In another example, the link stopper bracket 520 may be configured to be fixed to the link rod 320 and to move in cooperation with the lengthwise movement of the armrest cover 200.

The link stopper bracket 520 may be configured to adjust a length of the link stopper 510 including inner sides corresponding to the trapezoidal section 511. When the link stopper bracket 520 moves in the lengthwise direction and the inner sides of the link stopper bracket 520 push the trapezoidal section 511, a length of the link stopper 510 can be configured to become short.

When the power transmission unit 300 moves in a lengthwise direction, the trapezoidal section 511 may be configured to be caught to the link stopper bracket 520 such that the length of the link stopper 510 becomes short. When the trapezoidal section 511 is caught on the inner sides of the link stopper bracket 520, the opposite ends of the link stopper 510 can be configured to be released from the fixing recesses 410.

According to an embodiment of the present disclosure, the locking unit 500 of the bidirectional sliding armrest may be configured to include link stopper guides 540. The link stopper guides 540 are formed to enclose the link stopper 510, and may be configured to restrict a widthwise movement of the link stopper 510. In another example, the link stopper guides 540 may be formed in a pair so as to surround upper and lower surfaces of the link stopper 510 in a height direction.

The link stopper guide 540, formed to enclose the upper surface of the link stopper 510, may be configured to be fastened to the locking unit 500. The link stopper guide 540, formed to enclose the lower surface of the link stopper 510, may be configured to be fastened to the spring section 600.

When the link stopper bracket 520 moves in the lengthwise direction, the link stopper 510 may be configured to be adjusted in length along the link stopper guide 540. In one example, the link stopper guide 540 may be configured such that the widthwise movements of the trapezoidal sections 511 and the opposite ends of the link stopper 510 are restricted.

The opposite ends of the link stopper 510 are inserted into the fixing recesses 410 when the position of the armrest cover 200 is fixed, and each of the trapezoidal sections 511 is in contact with the inner sides of the link stopper bracket 520. When a user pulls and turns the knobs 310, the link rod 320 may be configured to move forward in a lengthwise direction, and the link stopper bracket 520 may be configured to move forward in a lengthwise direction.

When the link stopper bracket 520 moves forward in a lengthwise direction, the trapezoidal section 511 is caught on the inner sides of the link stopper bracket 520 to allow the length of the link stopper 510 to be reduced. When the length of the link stopper 510 is reduced, the opposite ends of the link stopper 510 can be unfixed from each of the fixing recesses 410.

Figure 7:
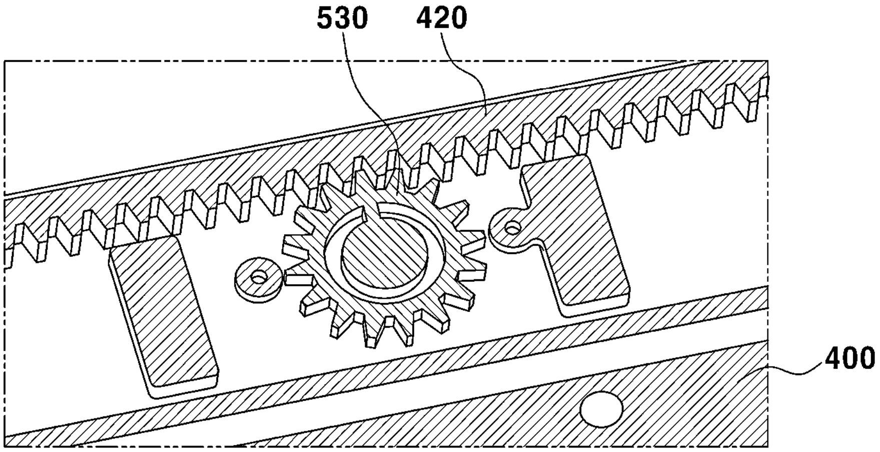
FIG. 7 illustrates a sliding damper and a gear section of the bidirectional sliding armrest as an embodiment of the present disclosure.

FIG. 7 illustrates a sliding damper 530 and a gear section 420 of the bidirectional sliding armrest as an embodiment of the present disclosure.

Referring to FIG. 7, the locking unit 500 further includes a slide damper 530, and the console fixing unit 400 includes the gear section 420 so as to allow the armrest cover 200 to move to opposite sides in a lengthwise direction.

The slide damper 530 may be configured to be connected to the armrest cover 200. In one example, the slide damper 530 may be configured to move in the lengthwise direction while meshed with the gear section 420. The gear section 420 may be formed to correspond to the lengthwise movement distance of the slide damper 530. The gear section 420 is formed at the upper end of the console fixing unit 400, and the fixing recess 410 may be formed at the lower end of the console fixing unit 400.

Figure 8:
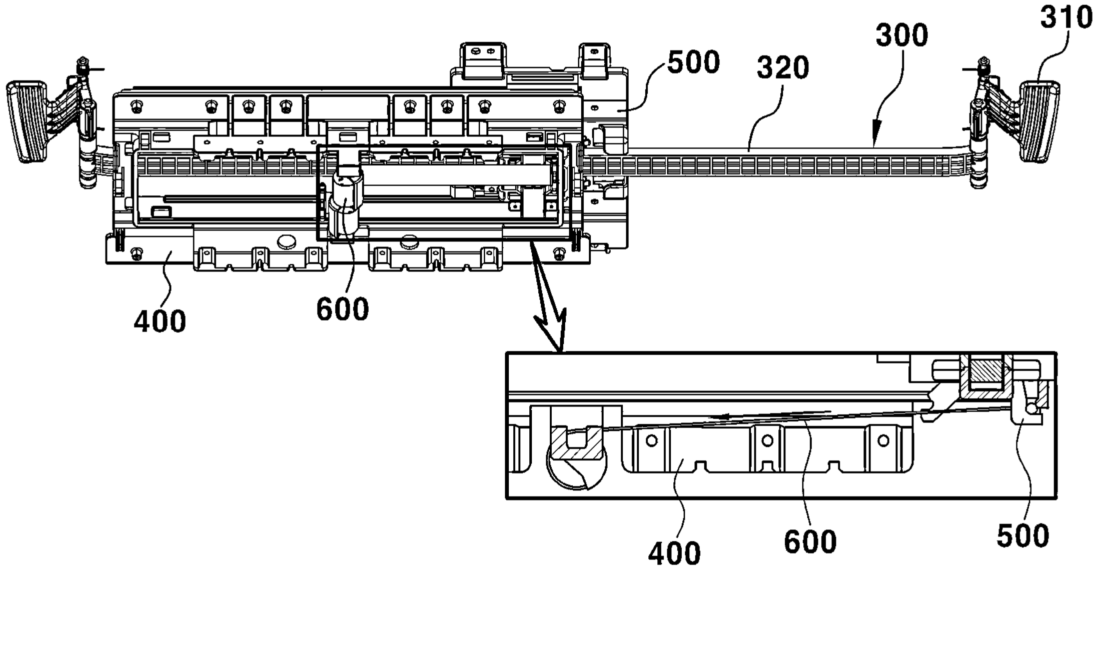
FIG. 8 illustrates a spring section of the bidirectional sliding armrest as an embodiment of the present disclosure.

FIG. 8 illustrates the spring section 600 of the bidirectional sliding armrest, as an embodiment of the present disclosure.

Referring to FIG. 8, the bidirectional sliding armrest, according to an embodiment of the present disclosure, may be configured to further include a spring section 600 such that one end thereof is fixed to the console fixing unit 400 and the other end thereof is fixed to the locking unit 500. In addition, the spring section 600 may be configured to provide elastic restoring force to the armrest cover 200.

In one example, the spring section 600 may be made up of a leaf spring. A body of the spring section 600 is fastened to the console fixing unit 400, and an end of the spring section 600 is fastened to the locking unit 500, so that an end of the armrest cover 200 can be increased according to the lengthwise movement.

When a user rotates the knobs 310 with the link stopper 510 fixed to the fixing recess 410 located at an end of the console fixing unit 400, the spring section 600 is unlocked to be able to provide elastic restoring force to the armrest cover 200. In one embodiment, the spring section is configured to apply an elastic restoring force that biases the armrest cover rearward in the lengthwise direction of the vehicle. A final fixed position of the armrest cover 200 is determined by selective fixation to a selected one of the plurality of fixing recesses.

To sum up, the present disclosure provides the bidirectional sliding armrest by applying a structure in which the armrest cover 200 and the locking unit 500 are connected. Thus, the bidirectional sliding armrest can be fixed in a desired position after being slid in the opposite directions, and can be used to correspond to various seating positions of a passenger in an autonomous vehicle.

The description mentioned herein is given to provide an understanding of the present disclosure by way of example, and the present disclosure can be used in various other combinations, modifications, and environments. In other words, the description mentioned herein may be changed or modified within the scope of the inventive concept as expressed herein, and within the scope of the teachings herein and/or the ordinary skill or knowledge of the related art. The embodiments described herein are further intended to explain best known modes of practicing the disclosure, and can be made to allow the various modifications required by the particular applications or uses. Accordingly, the detailed description of the present disclosure is not intended to limit the present disclosure to the form disclosed herein. Also, it should be construed that the appended claims include alternative embodiments.

What is claimed is:

1. A bidirectional sliding armrest comprising:

an armrest cover configured to be locatable at an upper portion of a console body provided in a vehicle body so as to be spaced apart therefrom;

a power transmission unit disposed at a lower portion of the armrest cover and configured to move to correspond to operation of the armrest cover;

a console fixing unit configured to be locatable on the console body and configured to include a plurality of fixing recesses;

a locking unit configured to be fixable on a lower surface of the armrest cover, fixed to the plurality of fixing recesses, and configured to fix a lengthwise position of the armrest cover;

a link stopper at which a trapezoidal section is formed and opposite ends of which are inserted into the fixing recesses; and a link stopper bracket, mechanically fastened to a link rod of the power transmission unit, including inner sides corresponding to the trapezoidal section, wherein the link stopper bracket is formed to enclose sides of the link stopper.

2. The bidirectional sliding armrest claimed in claim 1, wherein the power transmission unit includes:

a knob, one end of which is fastened to one end of the armrest cover; and the link rod connected to the other end of the knob, wherein the link rod is configured to move in a lengthwise direction by rotation of one end of the knob as the knob is pulled upward.

3. The bidirectional sliding armrest claimed in claim 1, wherein, when the power transmission unit moves in a lengthwise direction, the trapezoidal section is caught on the link stopper bracket to reduce a length of the link stopper, and opposite ends of the link stopper are released from the fixing recesses.

4. The bidirectional sliding armrest claimed in claim 1, wherein:

the locking unit further includes a slide damper connected to the armrest cover, and the console fixing unit includes a gear section configured to be engaged with the slide damper in a lengthwise direction, so that the armrest cover is configured to be able to move to opposite sides of the console body in a lengthwise direction.

5. The bidirectional sliding armrest claimed in claim 1, wherein the locking unit further includes a link stopper guide formed to enclose the link stopper and configured to constrict widthwise movement of the link stopper.

6. A bidirectional sliding armrest comprising:

an armrest cover configured to be locatable at an upper portion of a console body provided in a vehicle body so as to be spaced apart therefrom;

a power transmission unit disposed at a lower portion of the armrest cover and configured to move to correspond to operation of the armrest cover;

a console fixing unit configured to be locatable on the console body and configured to include a plurality of fixing recesses;

a locking unit configured to be fixable on a lower surface of the armrest cover, fixed to the plurality of fixing recesses, and configured to fix a lengthwise position of the armrest cover;

a spring section, one end of which is fixed to the console fixing unit, and the other end of which is fixed to the locking unit, wherein the spring section is configured to apply an elastic restoring force that biases the armrest cover rearward in a lengthwise direction of a vehicle; and a link stopper bracket, mechanically fastened to a link rod of the power transmission unit, including inner sides corresponding to a trapezoidal section of a link stopper, wherein the link stopper bracket is formed to enclose sides of the link stopper.

* * * * *